US012505836B2

(12) United States Patent
Sandberg et al.

(10) Patent No.: US 12,505,836 B2
(45) Date of Patent: Dec. 23, 2025

(54) CONTROLLING A SET OF DEVICES BY A VOICE-CONTROLLED DEVICE (71) Applicant: Telefonaktiebolaget LM Ericsson (publ), Stockholm (SE)

(72) Inventors: Sara Sandberg, Luleå (SE); Magnus Thurfjell, Luleå (SE); Adam Bergkvist, Luleå (SE); Nicklas Sandgren, Luleå (SE); Jonas Lundberg, Luleå (SE); Kjell Larsson, Luleå (SE); Peter Hedman, Kungsängen (SE); Peter Ökvist, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 223 days.

(21) Appl. No.: 17/909,209

(22) PCT Filed: Mar. 5, 2020

(86) PCT No.: PCT/EP2020/055870
§ 371 (c)(1),
(2) Date: Sep. 2, 2022

(87) PCT Pub. No.: WO2021/175426
PCT Pub. Date: Sep. 10, 2021

(65) Prior Publication Data
US 2023/0093648 A1  Mar. 23, 2023

(51) Int. Cl.
*G10L 15/22* (2006.01)
*G10L 15/30* (2013.01)
(Continued)

(52) U.S. Cl.
CPC .............. *G10L 15/22* (2013.01); *G10L 15/30* (2013.01); *H04L 12/282* (2013.01); *H05B 47/12* (2020.01);
(Continued)

(58) Field of Classification Search
CPC ........................................................ G10L 15/22
See application file for complete search history.

(56) References Cited

U.S. PATENT DOCUMENTS 9,984,686 B1    5/2018 Mutagi et al.
10,425,780 B1 *  9/2019 Devaraj ................. H04W 4/08
(Continued)

OTHER PUBLICATIONS

International Search Report and Written Opinion issued in International Application No. PCT/EP2020/055870 dated Dec. 3, 2020 (10 pages).
(Continued)

*Primary Examiner* — Douglas Godbold
(74) *Attorney, Agent, or Firm* — Rothwell, Figg, Ernst & Manbeck, P.C.

(57) ABSTRACT

A method of controlling a set of devices (101, 102, 103, 104 and 105) is proposed. The method is performed by a voice-controlled device (100). In response to receiving (S201) a first voice command of a user comprising a first reference to at least one device of the set of devices and a control command to be performed on the at least one device of the set of devices, the voice-controlled device presents (S202) an identifier in association with each of the at least one device of the set of devices. In response to receiving (S203) a second voice command from the user comprising a second reference to one or more of the identifiers, the voice-controlled device controls (S204) one or more of the at least one device of the set of devices which can be identified based on the second reference comprised in the
(Continued)

second voice command to execute the control command comprised in the first voice command.

13 Claims, 5 Drawing Sheets

(51) Int. Cl.
*H04L 12/28* (2006.01)
*H05B 47/12* (2020.01)
*H05B 47/175* (2020.01)
*H05B 47/19* (2020.01)

(52) U.S. Cl.
CPC ........... *H05B 47/19* (2020.01); *H05B 47/197* (2024.01); *G10L 2015/223* (2013.01)

(56) References Cited

U.S. PATENT DOCUMENTS

| | | | | |
|---|---|---|---|---|
| 10,482,904 | B1* | 11/2019 | Hardie | G10L 15/20 |
| 10,685,669 | B1* | 6/2020 | Lan | G10L 25/51 |
| 10,878,812 | B1* | 12/2020 | Helwani | G10L 25/84 |
| 10,909,983 | B1* | 2/2021 | Peng | G06F 18/254 |
| 11,361,764 | B1* | 6/2022 | Zhao | G06F 40/30 |
| 2018/0108351 | A1* | 4/2018 | Beckhardt | G06F 3/165 |
| 2018/0211665 | A1* | 7/2018 | Park | G10L 15/22 |
| 2019/0311720 | A1* | 10/2019 | Pasko | G06F 3/167 |

OTHER PUBLICATIONS

Seagan, S., "The Best Smart Speakers for 2020," UK PC Mag, Feb. 17, 2020 (18 pages).
Amazon, "Alexa User Guide: Learn What Alexa Can Do," Mar. 9, 2020 (3 pages).
Apple, "The new sound of home," www.apple.com/homepod, Mar. 9, 2020 (22 pages).
Apple, "HomeKit," apple.com/shop/accessories/all-accessories/homekit, Mar. 9, 2020 (5 pages).
Google, "Google Assistant", www.google.com, Sep. 2, 2022 (4 pages).
Swipe, "Swipe the Magic", www.fibaro.com, Mar. 9, 2020 (15 pages).
IKEA, "Vitsand OLED", www.ikea.com, Aug. 16, 2022 (6 pages).
Youtube, "2016 BMW 7 Series—Gesture Control", www.youtube.com, Mar. 9, 2020 (2 pages).
USA Today, "BMW's 7-Series 'gesture controls' work pretty well", eu.usatoday.com, Mar. 9, 2020 (2 pages).

* cited by examiner

CONTROLLING A SET OF DEVICES BY A VOICE-CONTROLLED DEVICE

CROSS REFERENCE TO RELATED APPLICATIONS

This application is a 35 U.S.C. § 371 National Stage of International Patent Application No. PCT/EP2020/055870, filed 2020 Mar. 5.

TECHNICAL FIELD

Embodiments presented herein relate to a method, a voice-controlled device, a computer program, a computer program product and a carrier for controlling a set of devices.

BACKGROUND

Smart devices are used more and more in homes. Everything from fixed installations such as central heating and cooling systems, to smaller things like lightbulbs gets connected. It is also common to have smart TVs, smart electronic locks and smart window blinds. Classical interfaces to control devices, such as hardware buttons and remotes, still dominate. However, more and more devices come with the possibility to be controlled using voice commands and/or an app using a mobile phone.

One problem of controlling a set of devices is how to address a certain device among several devices in the set.

As an example, in a scenario where voice commands are used to control the lights in a room, it is usually not a problem to turn on or off all lights. It becomes more complicated if one or more lights should be controlled individually. This may be solved by assigning names to the lights, or group of lights, such as "window" or "ceiling". However, in large rooms (e.g., conference rooms, exhibition halls, lecture halls, or similar) there can be several lights of the same kind, and it can be difficult to distinguish and remember all the lights by their names.

Gesture control has not yet become as popular but there are examples where a user can, e.g., dim lights by moving a hand up and down in front of a panel or close to a sensor of a device. By gesture control a user may point to a device the user wants to control. Such a gesture-controlled system may be lack of feedback, which causes an uncertainty about which device the user is actually controlling.

Hence, there is a need for an improved method to control device(s) of a set of devices individually.

SUMMARY

According to a first aspect of the invention there is presented a method for controlling a set of devices. The method is performed by a voice-controlled device. The method includes receiving a first voice command from a user of the voice-controlled device. The first voice command comprises a first reference to at least one device of the set of devices and a control command to be performed on the at least one device of the set of devices. The method includes presenting an identifier in association with each of the at least one device of the set of devices. The method includes receiving a second voice command from the user. The second voice command comprises a second reference to one or more of the identifiers. The method includes controlling one or more of the at least one device of the set of devices which can be identified based on the second reference comprised in the second voice command to execute the control command comprised in the first voice command.

According to a second aspect of the invention there is presented a voice-controlled device for controlling a set of devices, the voice-controlled device comprises processing circuitry which causes the voice-controlled device to be operative to receive a first voice command from a user of the voice-controlled device. The first voice command comprises first reference to at least one device of the set of devices and a control command to be performed on the at least one device of the set of devices. The voice-controlled device is operative to present an identifier in association with each of the at least one device of the set of devices. The voice-controlled device is operative to receive a second voice command from the user. The second voice command comprises a second reference to one or more of the identifiers. The voice-controlled device is operative to control one or more of the at least one device of the set of devices which can be identified based on the second reference comprised in the second voice command to execute the control command comprised in the first voice command.

According to a third aspect of the invention there is presented a computer program for controlling a set of devices. The computer program comprises computer code which, when run on processing circuitry of a voice-controlled device, causes the voice-controlled device to receive a first voice command from a user of the voice-controlled device. The first voice command comprises a first reference to at least one device of the set of devices and a control command to be performed on the at least one device of the set of devices. The computer code causes the voice-controlled device to present an identifier in association with each of the at least one device of the set of devices. The computer code causes the voice-controlled device to receive a second voice command from the user. The second voice command comprises a second reference to one or more of the identifiers. The computer code causes the voice-controlled device to control one or more of the at least one device of the set of devices which can be identified based on the second reference comprised in the second voice command to execute the control command comprised in the first voice command.

According to a fourth aspect of the invention there is presented a computer program product comprising a computer readable storage medium on which a computer program according to the third aspect, is stored.

According to a fifth aspect of the invention there is a carrier containing the computer program according to the third aspect, wherein the carrier is one of an electronic signal, an optical signal, a radio signal, and a computer readable storage medium.

Advantageously, these aspects provide a simple way to control device(s) individually in a set of devices.

Advantageously, these aspects provide a mechanism to interact with devices in a way that is more natural and conversation like.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description of the figures. Any step or feature illustrated by dashed lines should be regarded as optional.

With the development in the voice recognition area, affordable voice-controlled devices/voice assistants in the form of a small pod that you place on a table top have become popular, among others Amazon Echo & Alexa, Apple HomePod and Google Home. These voice-controlled devices/voice assistants allow you to integrate a set of devices and make them controllable with voice commands. In addition to simple commands, the Google Home assistant has some support for dialogs. For example, when a user asks the Google Home voice assistant to find his/her mobile phone, the voice assistant offers that it can control the mobile phone ring at full volume, and asks the user for confirmation before executing.

Figure 1:
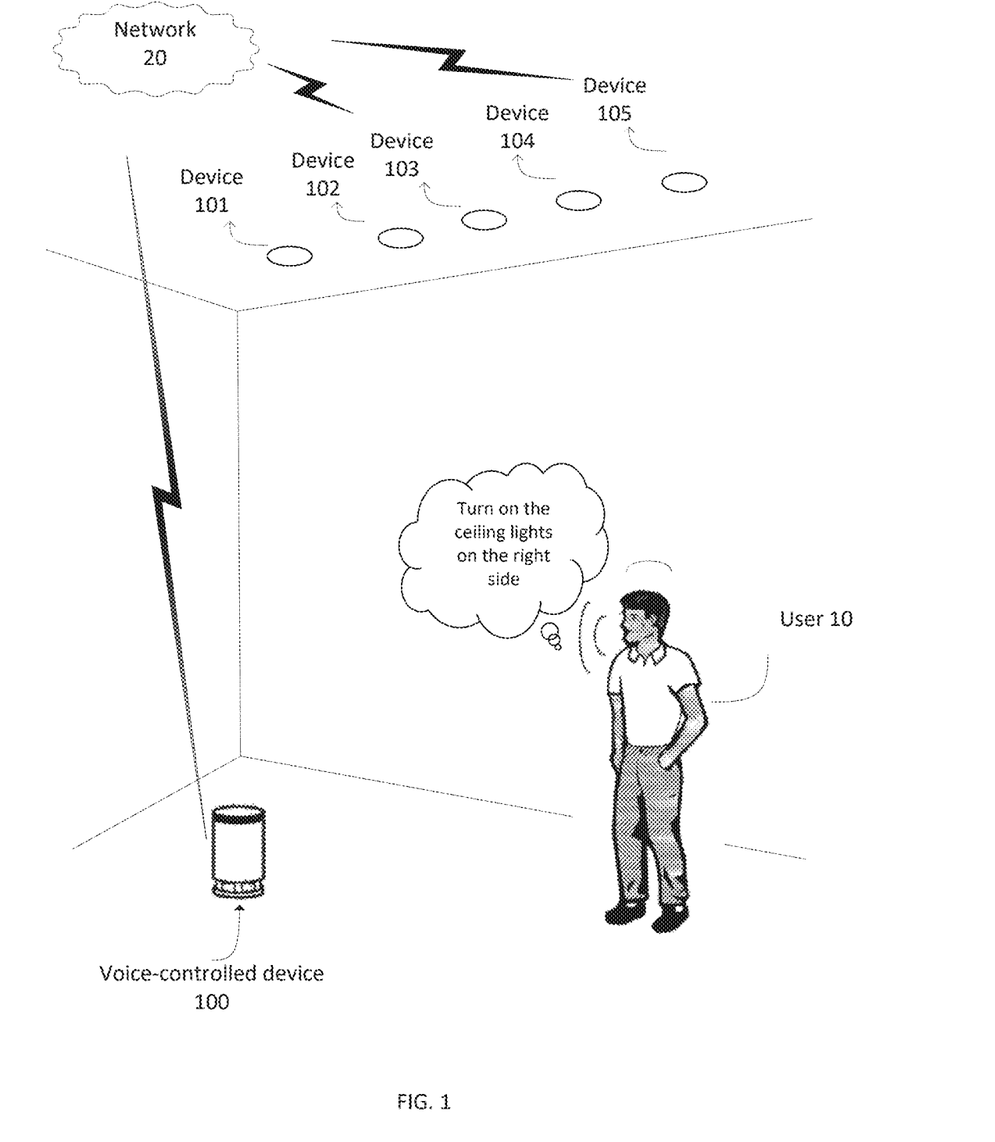
FIG. 1 schematically illustrates controlling a set of devices using a voice-controlled device, in accordance with embodiments of the invention.

FIG. 1 schematically illustrates controlling a set of devices using a voice-controlled device 100. There are several ceiling lights on the right side of a room, that is device 101, device 102, device 103, device 104, and device 105. Ceilings lights/lamps are only used here for illustration purpose. The devices may be any kind of devices that may be configured to operate. For example, the devices may be electronic devices, such as lights/lamps, loudspeakers, computers, tablets, mobile phones, window blinds, electronic locks, dishwashers, washing machines, refrigerators, televisions, and the like. These devices may be communicating with each other and with the voice-controlled device (100) via a network 20, e.g., a local area network (LAN), wide area network (WAN), short-range wireless radio communication such as Bluetooth, Zigbee, etc. As such, these devices may be controlled by a user 10 via the voice-controlled device (Dm).

In some embodiments the voice-controlled device 100 may include one or more microphones for generating audio signals based on captured sound, including voice commands of the user 10. The voice-controlled device 100 may be configured to perform speech recognition on the audio signals. Speech recognition enables the recognition and translation of spoken language into text by computers. The voice-controlled device may be configured to interact with and at least partly control the other devices in the environment.

For example, the user may issue a voice command to the voice-controlled device 100 to "Turn on the ceiling lights on the right side". The voice-controlled device 100 may perform ASR on a generated audio signal to identify the command ("Turn on") along with the referred devices ("Ceiling lights on the right side"). Since there are several ceiling lights on the right side (101, 102, 103, 104 and 105), further instructions are needed to limit the ceiling lights in an easy way, so that the voice-controlled device 100 may perform the operation requested by the user. The embodiments of the invention provide a solution to this problem.

Figure 2:
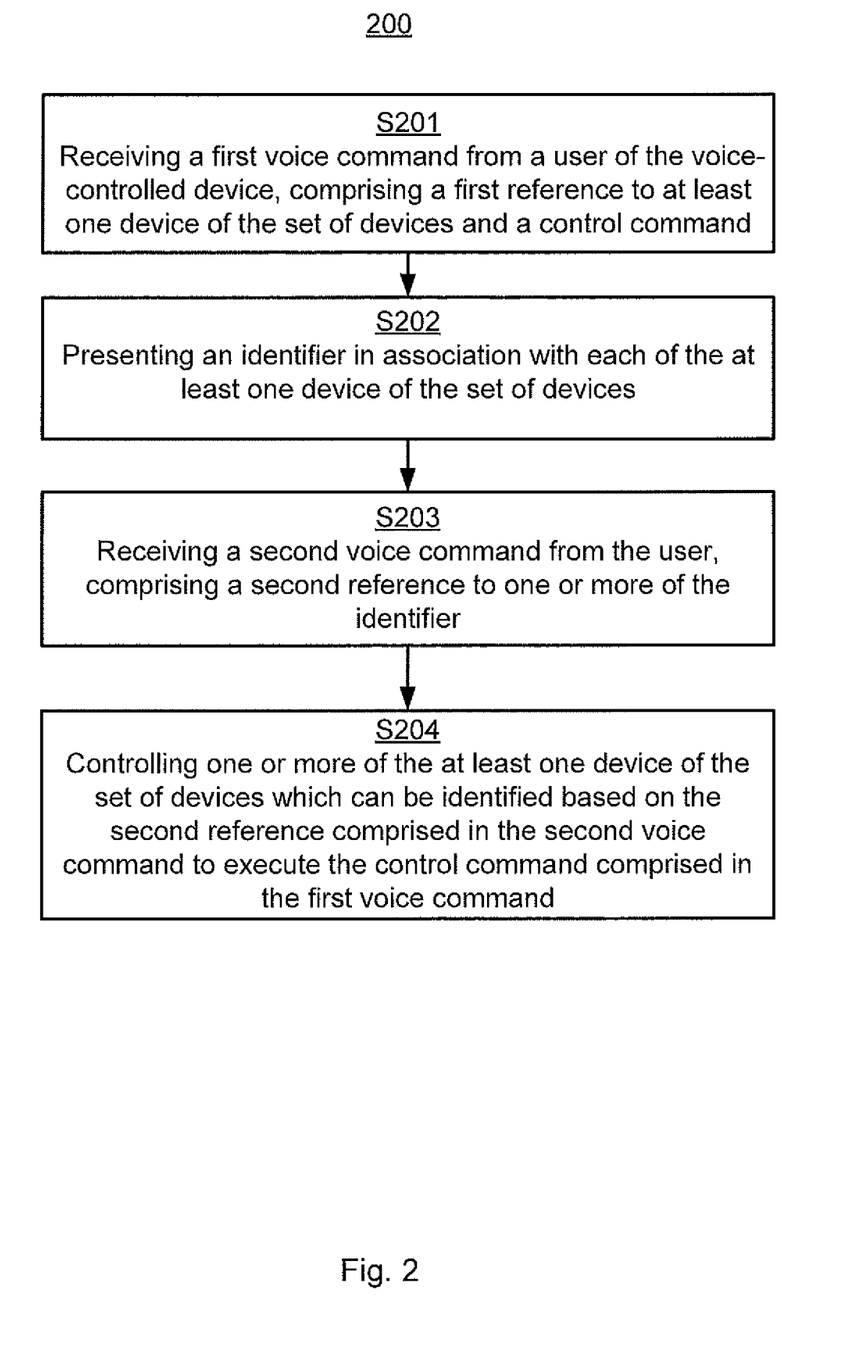
FIG. 2 is a flowchart of a method for controlling a set of devices, according to an embodiment of the invention.

FIG. 2 is a flowchart illustrating an embodiment of a method 200 for controlling a set of devices. The method 200 is performed by a voice-controlled device 100. The method is advantageously provided as a computer program 620.

S201: Receiving a first voice command from a user of the voice-controlled device, the first voice command comprising a first reference to at least one device of the set of devices and a control command to be performed on the at least one device of the set of devices.

Using the same illustrating example as in FIG. 1, a user 10 enters a room with several ceiling lamps (101, 102, 103, 104 and 105) on the right side. The user gives a voice command "Turn on the ceiling lights on the right side" to the voice-controlled device 100. The voice-controlled device 100 performs speech recognition on the received audio signal for acquiring contents of the voice command. The voice-controlled device 100 may compare the acquired contents of the voice command with pre-stored voice training records that may be stored in the memory of the voice-controlled device 100 or in the memory of a server. After comparison the voice-controlled device 100 may extract the first reference, which in this scenario is the ceiling lamps (101, 102, 103, 104 and 105) on the right side of the room, and the control command, which in this scenario is "Turn on".

In some embodiments when the voice-controlled device 100 isn't able to extract the first reference and the control command from the first voice command, the voice-controlled device 100 may ask the user to repeat the first voice command.

S202: Presenting an identifier in association with each of the at least one device of the set of devices.

Using the same illustrating example as in FIG. 1, each ceiling lamp (101, 102, 103, 104 and 105) on the right side of the room may present itself by a colour, such as blue, yellow, red, orange, and green. Smart light bulbs that can change colour and be controlled via Bluetooth and/or by voice commands are already available, for example "hue bulbs" from Phillips (https://www2.meethue.com/en-us/bulbs). Thereby, each of the ceiling lamps 101-105 is individually identifiable by the user.

S203: Receiving a second voice command from the user, wherein the second voice command comprising a second reference to one or more of the identifiers.

Using the same illustrating example as in FIG. 1, the second voice command may be "Blue and yellow", "Blue and yellow lights", "Blue and yellow lamps" etc.

S204: Controlling one or more of the at least one device of the set of devices which can be identified based on the second reference comprised in the second voice command to execute the control command comprised in the first voice command.

Using the same illustrating example as in FIG. 1, the voice-controlled device 10o may turn on the lamps having the identifiers of blue and yellow colour with normal light.

The proposed method 20o receives at least two voice commands where the first voice command is to initiate an action. Based on the first voice command a selection of the set of devices is enabled by the devices presenting themselves with an identifier. A second voice command is issued to select more specifically the device(s) that should be controlled and optionally confirm the selection of the set of devices. Although in the above-mentioned method 200 only two voice commands are illustrated, it is considered obvious for the person skilled in the art that further voice commands may be used to specify the device(s) that should be controlled by an iterative procedure.

In some embodiments, the user may give an initial voice command "Please highlight all devices that can be controlled" so that all the controllable devices may highlight themselves by an identifier.

In some embodiments the identifier is a visual identifier or an audible identifier.

In some embodiments the visual identifier is at least one of: a colour, a number, a letter, a symbol, a code, and a blinking pattern. All these embodiments should be presented as alternatives which could also be combined.

In some embodiments the visual identifier is presented by at least one of: projecting the visual identifier on a surface of the device, displaying the visual identifier on a display of the device, and activating a light of the device.

In some embodiments, devices may have some kind of status indicator, e.g., a Light Emitting Diode (LED) light, or in the case of a light bulb, the light itself may be used as status indicator. The voice-controlled device 100 may for example let the status indicators of the considered devices start blinking to highlight themselves. Each status indicator may have a blinking pattern, such as fast blink, slow blink, heart-beat blink.

In some embodiments, the set of devices maybe divided into subsets and the step S202 of presenting the identifier in association with each of the at least one device of the set of devices further comprises presenting a subset identifier in association with one or more subsets of the set of devices. The subset identifier is a visual identifier or an audible identifier. One example is, when receiving the first voice command from the user to "Turn on the lights", the lamps in the room will be grouped into several subsets based on their positions or some other criteria, e.g. pre-defined subsets of the set of devices or based on historical command patterns. There may be one subset of devices near the TV, one subset near the window on the left side, one subset near the window on the right side. Each subset may have a subset identifier such as a colour, and each lamp in the subset may have a blinking pattern. The user may give a second voice command specifying a colour to choose one specific subset. The user may also give a second command specifying a combination of a colour with a blinking pattern to control a single lamp. Each subset may be further divided. For example, one subset of the set of devices may be ceiling lights presenting with red colour. The ceiling lights on the left side of the room may be blinking whereas the ceiling lights on the right side of room are not blinking. In some embodiments, creating a subset of devices may include storing, for each device of the subset, an indication that the respective device is part of the subset in a database, either at the voice-controlled device 100 or at some other remote place (such as on a server). Consequently, when the voice-controlled device 100 receives a voice command referring to a subset of the devices, the voice-controlled device 100 may identify, using the indications stored in the database, the devices that form the subset and may instruct each device of the subset to perform the operation. Alternatively, each device may know its association to a subset, and the voice-controlled device broadcasts commands, which the relevant devices execute.

Combinations of e.g. numbers, colours and symbols may define various combinations of subsets of the set of devices, thereby allowing extensive flexibility when controlling various devices.

In some embodiments, the voice-controlled device 100 is equipped with a projector capable of projecting markers, e.g. in the form of shapes and colors, onto physical items in the room. The projector may be utilized to highlight any devices, especially devices that may not be able to highlight themselves otherwise such as a washing machine. For example, when the user wants to control one wall-mounted light, the voice-controlled device 100 can project a number onto each of the wall-mounted lights. The user may specify the intended wall-mounted light by simply saying the corresponding number. The projector may also point at items requested by the user or display status messages on a wall visible to the user.

In some embodiments, the projector can project markers in the form of shapes to indicate the light strength of a lamp. For example, if a circle is projected on or near a lamp, a full circle may illustrate 100% light strength, and half circle may illustrate 50% of max light strength. Alternatively, the chosen level of light strength in relation to max light strength may be shown in a specific color and be projected on or near the lamp.

In some embodiments, for a device with a display, the display may be used to highlight the device. The display may simply be lit and a number may be shown on the display to identify the device. For example, any TV or computer screen in the room may show a number on the display and this number may then be used to control the corresponding screen.

In some embodiments a device may use an external device present itself. For example, a TV that is initially turned off, may use a table top lamp placed nearby, such as on the same shelf, as TV's indicator to avoid turning TV's screen on. The voice-controlled device 100 may refer to the TV as "The screen next to the table top lamp" in a conversation. This requires that the voice-controlled device 100 has registered the position of each device and consequently has information about the nearby devices for each device. How to make the voice-controlled device 100 know the position of each device is described later in this application.

In some embodiments, one or more of the set of devices may be a lamp.

In some embodiments, one or more of the set of devices may have a display.

In some embodiment, one or more of the set of devices may be presented by a projecting light.

In some embodiments the audible identifier is audibly presented as at least one of: a number, a letter, a symbol, a code, and a ring sound. A ring sound/ring tone can be any combination of sound such as a piece of music or song. All these embodiments should be presented as alternatives which could also be combined.

Figure 3:
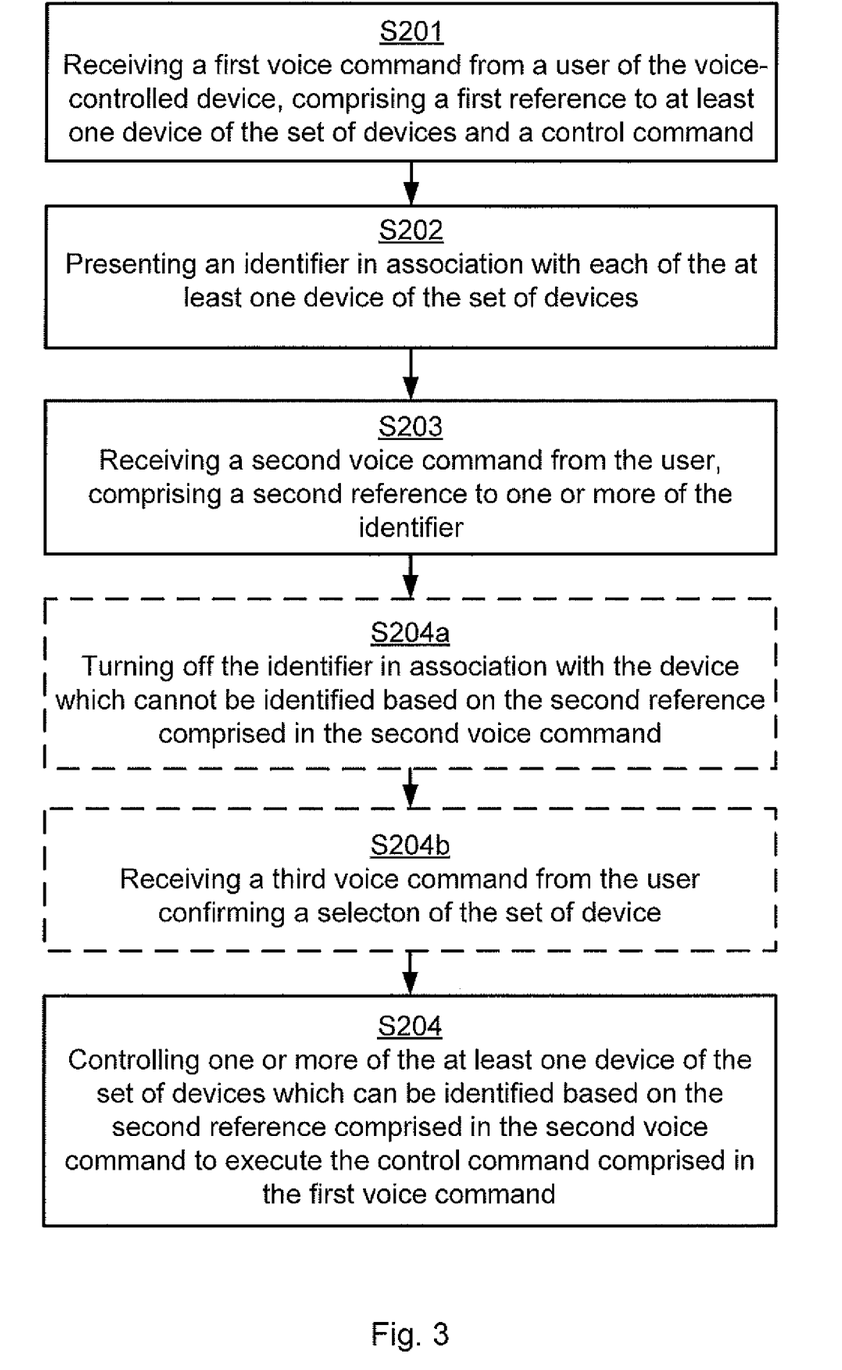
FIG. 3 is a flowchart of a method for controlling a set of devices according to another embodiment of the invention.

FIG. 3 is a flowchart illustrating another embodiment of a method for controlling a set of devices where the voice-controlled device 100 is configured to perform (optional) steps S204a and S204b (in dashed line).

The steps S204a and S204b follows the step of receiving (S203) a second voice command from the user, the second voice command comprising a second reference to one or more of the identifiers.

S204a: turning off the identifier in association with the device which cannot be identified based on the second reference comprised in the second voice command.

Using the same illustrating example as in FIG. 1, the voice-controlled device 100 turns off the other ceiling lamps on the right side of the room that are highlighted with other colours than blue and yellow, that is orange, red and green.

S204b: Receives a third voice command from the user confirming a correct selection of the set of devices.

At this step, using the same illustrating example as in FIG. 1, the user may confirm that the remaining lamps that are presented with blue and yellow are the right devices that he intends to control, and confirm the selection of devices by a third voice command such as "That's right". In this way, if the remaining lamps are not the ones the user intends to control, the user may issue another voice command to correct the selection of the set of devices.

Figure 4:
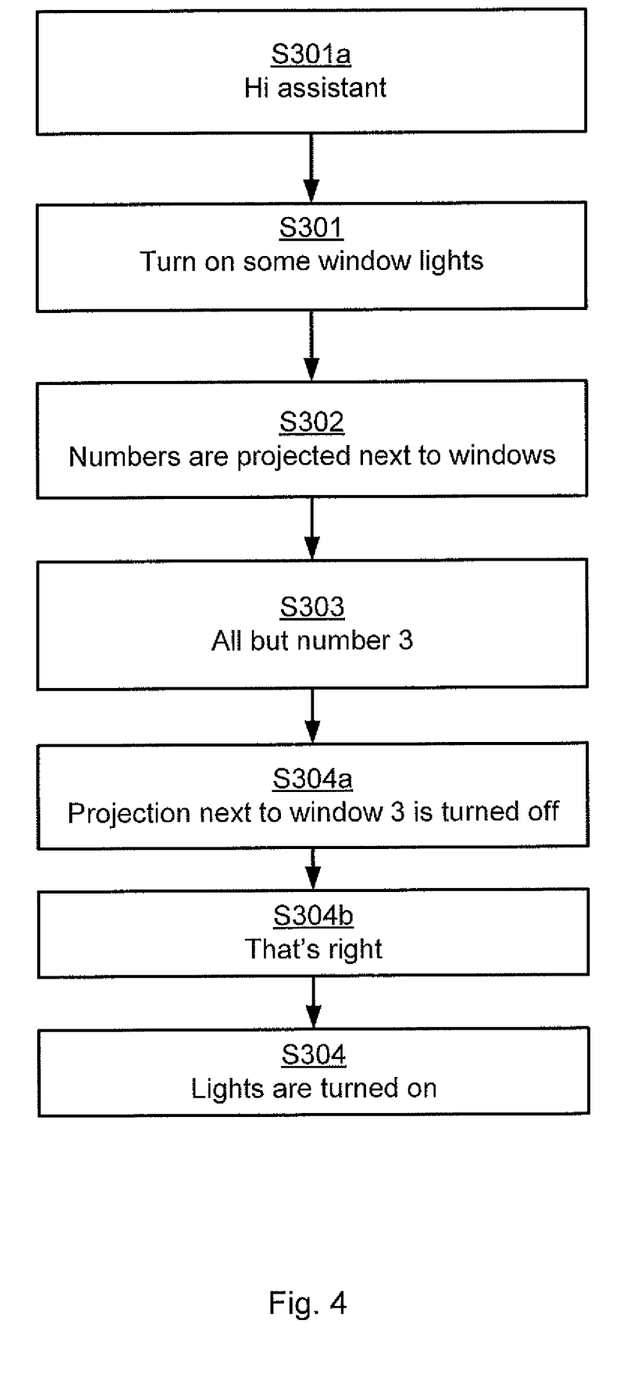
FIG. 4 is a flowchart of a method for controlling a set of devices according to another embodiment of the invention.

FIG. 4 is a flowchart illustrating an example of controlling specific window lights by using a projector following the method described in FIG. 3.

S301a: The user says something like "Hi assistant" to wake up the voice-controlled device 100. In some embodiments the voice-controlled device 100 may be in low power mode to save power. When its name ("Assistant" in this example) is spoken by the user the voice-controlled device 100 may switch to an active mode and wait for a voice command. If the voice command is not received within some period of time the voice-controlled device 100 will return to its original low power mode.

S301: The user gives the first voice command "Turn on some window lights", where the control command is "Turn on" and the first reference is "some window lights".

S302: Since there are several window lights and they cannot be distinguished by the first voice command, the projector is activated and a number is projected for each window light either on the window or next to the window.

S303: The user gives a second voice command "All but number 3". The content of this voice command is analysed, and the identifier 3 is extracted. The second reference to the identifier(s) is inferred by counting all the numbers excluding number 3. In this example, since there are totally 5 devices, the second reference is "1, 2, 4, 5", that is, all the identifiers used for the window lights except number 3.

S304a: Projection on or next to window 3 is turned off.

S304b: The user confirms with the third voice command "That's right".

S304: Lights are turned on accordingly.

In some embodiments, if the voice-controlled device 100 is equipped with a camera, new devices may be added to the set of devices by selection via a photo of the camera. In some embodiments the voice-controlled device 100 is a smart phone or a tablet equipped with a camera. The user 10 may take a photo of a room by the smart phone or tablet. In some other embodiments the voice-controlled device 100 is used in collaboration with a smart phone or a tablet taking a photo of the room. Different devices in the room may be identified on the photo by object detection, which is a computer technology related to computer vision and image processing that deals with detecting instances of semantic objects in digital images and videos. Existing devices, already known to the voice-controlled device 100, may be annotated on the photo. The voice-controlled device 100 may be configured into a learning mode. In some embodiments the user may provide input to the photo to confirm the device intended to be added. In some embodiments the voice-controlled device 100 may automatically identify devices that are not registered and provide these devices as proposal of new devices to the user. In some embodiments by analysing the photo of the room, the relative positions of the set of devices may be obtained and registered.

If a new device such as a lamp is added, the voice-controlled device 100 may register the new lamp and assign an identifier to the new lamp. The new lamp may present itself with the identifier to confirm this assignment. The other devices of the set of devices may present themselves with their identifiers at the same time to show setting of identifiers for the set of devices.

The voice-controlled device 100 may register properties of the new added device. The voice-controlled device 100 may communicate with the user to acquire properties of the new added device.

In some embodiments, the voice-controlled device 100 may further comprise gesture control function. In some embodiments the user may physically point at devices in the room and the voice-controlled device 100 may track the user's hand by the equipped camera. The voice-controlled device 100 may acknowledge the user's gesture by highlighting the devices he is pointing at.

The above-described embodiments are intended to be illustrative in all respects, rather than restrictive, of the embodiments. Thus the embodiments are capable of many variations in detailed implementation that can be derived from the description contained herein by a person skilled in the art. Voice commands illustrated in the above-described embodiments are also capable of many variations in detailed implementations.

Figure 5:
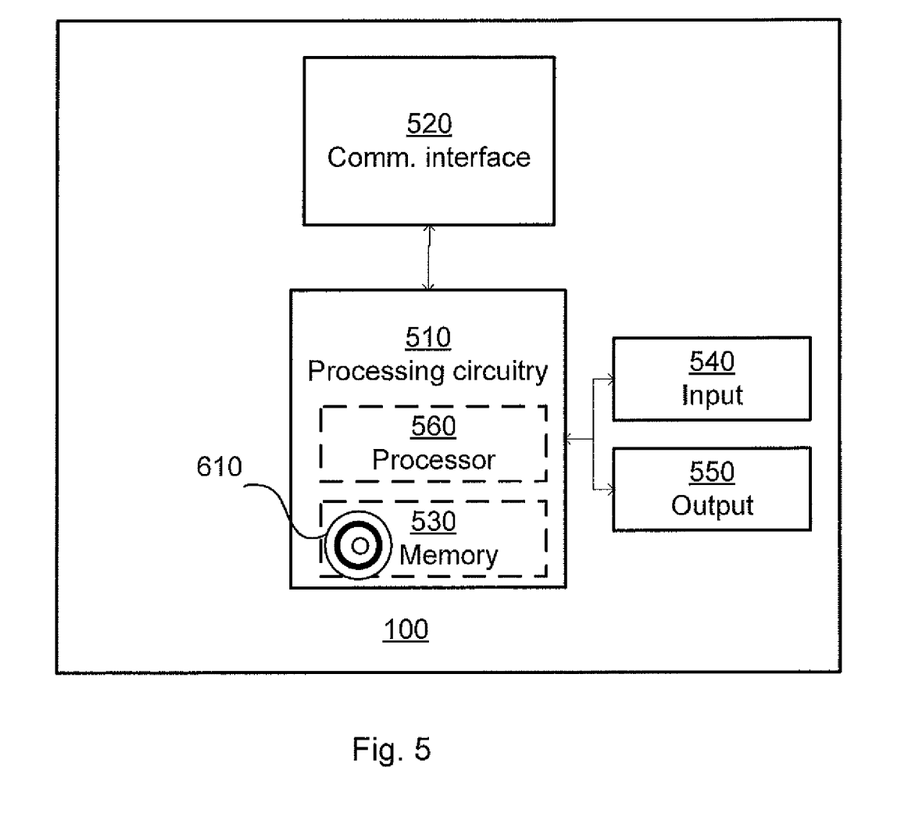
FIG. 5 schematically illustrates a voice-controlled device for controlling a set of devices, according to an embodiment of the invention.
Figure 6:
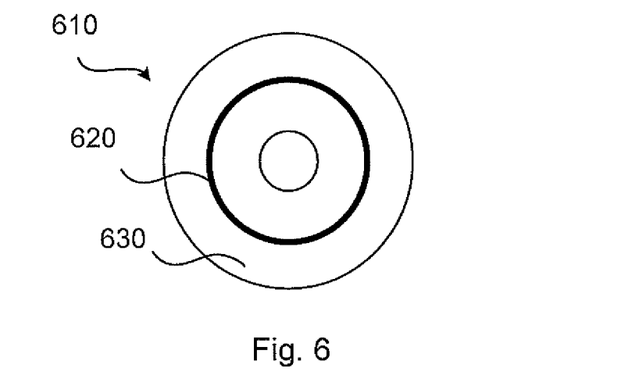
FIG. 6 shows an embodiment of a computer program product comprising computer readable storage medium according to an embodiment.

FIG. 5 schematically illustrates, in terms of a number of functional units, the components of a voice-controlled device 100 according to an embodiment. Processing circuitry 510 is provided using any combination of one or more of a suitable central processing unit (CPU), multiprocessor, microcontroller, digital signal processor (DSP), etc. The processing circuitry 510 may comprises a processor 560 and a memory 530 wherein the memory 530 contains instructions executable by the processor 560. The memory 530 may further contain the computer program product 610 (as shown in FIG. 6). The processing circuitry 510 may further be provided as at least one application specific integrated circuit (ASIC), or field programmable gate array (FPGA). The voice-controlled device 100 may comprise input 54o and output 550. The input 54o may include a keyboard, keypad, mouse, touch screen, joystick, control buttons, etc. In some implementations, one or more microphones (not shown in FIG. 5) may function as input to receive audio input, such as user voice command. The output 550 may include a display, a light element (e.g., LED), a vibrator to create haptic sensations, or the like. In some implementations, one or more speakers (not shown in FIG. 5) may function as output 550 to output audio sounds.

The voice-controlled device 100 may further comprise a communication interface 520. The communication interface 520 may implement one or more of various wireless technologies, such as Wi-Fi, Bluetooth, Zigbee, and so on. An Ethernet port (not shown in FIG. 5) may further be provided as part of the voice-controlled device 100 to facilitate a wired connection to a network, or a plug-in network device that communicates with other wireless networks. In addition to the USB port, or as an alternative thereto, other forms of wired connections may be employed, such as a broadband connection.

Particularly, the processing circuitry 510 is configured to cause the voice-controlled device 100 to perform a set of operations, or steps, as disclosed above. For example, the memory 530 may store the set of operations, and the processing circuitry 510 may be configured to retrieve the set of operations from the memory 530 to cause the voice-controlled device 100 to perform the set of operations. The set of operations may be provided as a set of executable instructions.

Thus the processing circuitry 510 is thereby arranged to execute methods as herein disclosed. The memory 530 may also comprise persistent storage, which, for example, can be any single one or combination of magnetic memory, optical memory, solid state memory or even remotely mounted memory.

FIG. 6 shows one example of a computer program product 610 comprising computer readable storage medium 630. On this computer readable storage medium 630, a computer program 620 can be stored, which computer program 620 can cause the processing circuitry 510 and thereto operatively coupled entities and devices, such as the communications interface 520, to execute methods according to embodiments described herein. The computer program 620 and/or computer program product 610 may thus provide means for performing any steps as herein disclosed.

In the example of FIG. 6, the computer program product 610 is illustrated as an optical disc, such as a CD (compact disc) or a DVD (digital versatile disc) or a Blu-Ray disc. The computer program product 610 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 620 is here schematically shown as a track on the depicted optical disk, the computer program 620 can be stored in any way which is suitable for the computer program product 610. A carrier may contain the computer program 620, wherein the carrier is one of an electronic signal, an optical signal, a radio signal, and a computer readable storage medium 630.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for controlling one or more devices, the method being performed by a voice-controlled device and comprising:
   receiving from a user a single first voice command comprising:
   i) information identifying a set of devices, the set of devices comprising a first subset of devices and a second subset of devices, the first subset of devices comprising a first device and a second device, and the second subset of devices comprising a third device, and
   ii) a control command to be performed on one or more devices included in the set of devices;
   in response to receiving the first voice command:
   i) presenting a first subset identifier associated with the first subset of devices,
   ii) presenting a second subset identifier associated with the second subset of devices,
   iii) presenting a first device identifier associated with the first device included in the first subset of devices, the first device identifier being distinct from the first subset identifier, and
   iv) presenting a second device identifier associated with the second device included in the first subset of devices, the second device identifier being distinct from both the first subset identifier and the first device identifier;
   receiving a second voice command from the user, the second voice command comprising a reference to the first device; and
   in response to receiving the second voice command, performing the control command comprised in the first voice command on the first device, wherein
   the first device identifier is a first visual identifier, and presenting the first visual identifier comprises i) projecting the first visual identifier on a surface of the first device, ii) activating a light of the first device, and/or iii) displaying the first visual identifier on a display of the first device.

2. The method of claim 1, wherein the method further comprises:
   turning off an identifier associated with a device which cannot be identified based on the reference comprised in the second voice command; and
   receiving a third voice command from the user confirming a correct selection of the first device.

3. The method of claim 1, wherein the reference to the first device included in the second voice command comprises a reference to the first subset identifier and a reference to the first device identifier.

4. The method of claim 1, wherein each device included in the set of devices has a display.

5. The method of claim 1, wherein presenting the first visual identifier comprises projecting the first visual identifier on i) a surface of the first device or ii) a surface adjacent to the first device.

6. The method of claim 1, wherein the method further comprises storing in a database:
   i) first subset information indicating that the first device and second device are included in the first subset of devices, and
   ii) second subset information indicating that the third device is included in the second subset of devices.

7. A voice-controlled device for controlling a set of devices, the voice-controlled device comprising processing circuitry causing the voice-controlled device to be operative to perform a method comprising:
   receiving from a user a single first voice command comprising:
   i) information identifying a set of devices, the set of devices comprising a first subset of devices and a second subset of devices, the first subset of devices comprising a first device and a second device, and the second subset of devices comprising a third device, and ii) a control command to be performed on one or more devices included in the set of devices;

in response to receiving the first voice command:
i) presenting a first subset identifier associated with the first subset of devices,
ii) presenting a second subset identifier associated with the second subset of devices,
iii) presenting a first device identifier associated with the first device included in the first subset of devices, the first device identifier being distinct from the first subset identifier, and
iv) presenting a second device identifier associated with the second device included in the first subset of devices, the second device identifier being distinct from both the first subset identifier and the first device identifier;

receiving a second voice command from the user, the second voice command comprising a reference to the first device; and in response to receiving the second voice command, performing the control command comprised in the first voice command on the first device, wherein
the first device identifier is a first visual identifier, and presenting the first visual identifier comprises i) projecting the first visual identifier on a surface of the first device, ii) activating a light of the first device, and/or iii) displaying the first visual identifier on a display of the first device.

8. The voice-controlled device of claim 7, wherein the voice-controlled device is further operative to:
turn off the identifier in association with the device which cannot be identified based on the second reference comprised in the second voice command; and
receive a third voice command from the user confirming a correct selection of the first device.

9. The voice-controlled device of claim 8, wherein the reference to the first device included in the second voice command comprises a reference to the first subset identifier and a reference to the first device identifier.

10. The voice-controlled device of claim 8, wherein each device included in the set of devices has a display.

11. The voice-controlled device of claim 8, wherein presenting the first visual identifier comprises projecting the first visual identifier on i) a surface of the first device or ii) a surface adjacent to the first device.

12. The voice-controlled device of claim 8, wherein the method further comprises storing in a database:

i) first subset information indicating that the first device and second device are included in the first subset of devices, and
ii) second subset information indicating that the third device is included in the second subset of devices.

13. A non-transitory computer readable medium storing a computer program for controlling a set of devices, the computer program comprising computer code which, when run on processing circuitry of a voice-controlled device, causes the voice-controlled device to perform a method comprising:
receiving from a user a single first voice command comprising:
i) information identifying a set of devices, the set of devices comprising a first subset of devices and a second subset of devices, the first subset of devices comprising a first device and a second device, and the second subset of devices comprising a third device, and
ii) a control command to be performed on one or more devices included in the set of devices;

in response to receiving the first voice command:
i) presenting a first subset identifier associated with the first subset of devices,
ii) presenting a second subset identifier associated with the second subset of devices,
iii) presenting a first device identifier associated with the first device included in the first subset of devices, the first device identifier being distinct from the first subset identifier, and
iv) presenting a second device identifier associated with the second device included in the first subset of devices, the second device identifier being distinct from both the first subset identifier and the first device identifier;

receiving a second voice command from the user, the second voice command comprising a reference to the first device; and in response to receiving the second voice command, performing the control command comprised in the first voice command on the first device, wherein
the first device identifier is a first visual identifier, and presenting the first visual identifier comprises i) projecting the first visual identifier on a surface of the first device, ii) activating a light of the first device, and/or iii) displaying the first visual identifier on a display of the first device.

* * * * *